United States Patent [19]

Duve et al.

[11] Patent Number: 4,587,417
[45] Date of Patent: May 6, 1986

[54] FIELD-ADJUSTABLE POWER CONTROL ARRANGEMENT AND METHODS OF CONTROLLING POWER AND OF ADJUSTING THE TIMING THEREOF

[75] Inventors: George Duve, Washington, N.J.; Harold Waage, Greentown, Pa.; Luther P. Quick, Hackettstown, N.J.

[73] Assignee: Area Lighting Research, Inc., Hackettstown, N.J.

[21] Appl. No.: 713,459

[22] Filed: Mar. 19, 1985

Related U.S. Application Data

[63] Continuation of Ser. No. 387,185, Jun. 10, 1982.

[51] Int. Cl.[4] .............................................. H01J 40/14
[52] U.S. Cl. .............................. 250/214 AL; 315/360
[58] Field of Search ...................... 315/159, 360, 362; 250/214 AL, 214 R, 206

[56] References Cited

U.S. PATENT DOCUMENTS

| | | |
|---|---|---|
| 4,008,415 | 2/1977 | DeAvila-Serafin et al. ........ 315/360 |
| 4,147,961 | 4/1979 | Elms ..................................... 315/291 |
| 4,198,574 | 4/1980 | Price et al. .......................... 315/360 |
| 4,209,728 | 6/1980 | Membreno .......................... 315/360 |
| 4,237,377 | 12/1980 | Sansum ....................... 250/214 AL |
| 4,292,570 | 9/1981 | Engel .................................... 315/360 |

*Primary Examiner*—David C. Nelms
*Assistant Examiner*—J. Gatto
*Attorney, Agent, or Firm*—Kirschstein, Kirschstein, Ottinger & Israel

[57] ABSTRACT

A field-adjustable power control arrangement for and method of controlling outdoor lighting systems in accordance with a timing cycle which turns an outdoor lighting system off at dawn, on at dusk, off at a nighttime turn-off time after dusk, and on at a morning turn-on time before dawn. The nighttime turn-off time and the morning turn-on time are manually adjustable in an analog and digital manner so as to permit easy and rapid field adjustment and/or factory pre-adjustment.

2 Claims, 2 Drawing Figures

FIELD-ADJUSTABLE POWER CONTROL ARRANGEMENT AND METHODS OF CONTROLLING POWER AND OF ADJUSTING THE TIMING THEREOF

This is a continuation of application Ser. No. 387,185 filed June 10, 1982.

BACKGROUND OF THE INVENTION

1. Field of the Invention

This invention generally relates to an ambient light-regulated power control arrangement for outdoor lighting systems and, more particularly, to a field-adjustable power control arrangement and method of controlling power thereof, as well as to a method of adjusting the timing thereof.

2. Description of the Prior Art

Various power control arrangements have been employed for automatically controlling outdoor lighting systems such as streetlighting loads, highway lighting loads, and area lighting loads. Typical area lighting loads are parking lots, parks, building perimeters, and advertising billboards. The automatic control of such arrangements guards against forgetfulness in operating the lighting system, prevents the isolation of the position of the lighting system from preventing the proper operation thereof, and promotes the efficient and economical utilization of energy.

The power control arrangements in current use for outdoor lighting systems are typically photoelectrically regulated by ambient light conditions, and are operative to automatically turn the lighting system on at dusk, off at dawn and, particularly in the case of area lighting loads, off sometime during the night. An example of an ambient light-regulated power control arrangement is shown in U.S. Pat. No. 3,916,183, which was assigned to the same assignee as the present invention.

Although generally satisfactory for their intended purpose, the known power control arrangements have not proven to be altogether satisfactory in the aspect of resetting the timing when the lighting system is turned off sometime during the night. For example, the power control arrangement described in the above patent employs mechanical timing components including motor-driven memory and timing gear wheels, each having a fixed number of gear teeth, and each having timing contacts spaced in a mutually fixed orientation so as to establish a fixed timing cycle. In the event that one wished to change the timing cycle of such a mechanical arrangement, the entire arrangement must be taken apart, the gear wheels may have to be replaced, and the placement of the timing contacts may have to be changed. This can be done only with great difficulty in the field, if at all. As a practical matter, the timing cycle for any particular application is established in the factory at the time of manufacture, and subsequent adjustment is not feasible.

Another desirable feature not found in power control arrangements in current use is to automatically turn on an area lighting system in the pre-dawn hours. Particularly in the wintertime, when it is still very dark outdoors in the pre-dawn hours, it is desirable to provide additional illumination to assist the flow of traffic and people, particularly children. In order to add this morning turn-on feature to existing installations using mechanical timing arrangements of the type described above, an extensive retrofitting operation is required, thereby effectively preventing this desirable option from being implemented.

SUMMARY OF THE INVENTION

1. Objects of the Invention

Accordingly, it is the general object of this invention to overcome the aforementioned drawbacks of the prior art power control arrangements.

Another object of this invention is to permit easy and rapid field adjustment and/or factory pre-adjustment of the timing cycle of a power control arrangement for outdoor lighting systems.

Still another object of this invention is to provide a simple-to-operate, field-adjustable power control arrangement for, and method of, controlling outdoor lighting systems, particularly area lighting systems.

Yet another object of this invention is to automatically turn on the power control arrangement in the pre-dawn hours to provide illumination.

It is another object of this invention to simplify the maintenance of power control arrangements.

An additional object of this invention is to provide a power control arrangement which is easily adapted to suit any particular timing application.

2. Features of the Invention

In keeping with these objects and others which will become apparent hereinafter, one feature of the invention resides, briefly stated, in a power control arrangement for, and method of, controlling outdoor lighting systems of the type comprising sensor means, i.e. a photocell, for detecting the ambient light intensity surrounding an outdoor light, and for generating a dawn signal and a dusk signal when dawn and dusk are respectively detected. A dawn turn-off signal for turning off the outdoor light at dawn is generated by a dawn-/dusk control means which is responsive to the generation of the dawn signal. The dawn/dusk control means is also operative to generate a dusk turn-on signal for turning on the outdoor light at dusk in response to the generation of the dusk signal.

In accordance with this invention, post-dusk control means responsive to the generation of the dawn and dusk signals, is operative for generating, at a nighttime turn-off time, a nighttime turn-off signal for turning off the outdoor light after dusk and upon the elapse of a first predetermined time period after midday which is established substantially midway between the detection of dawn and dusk during the day. In further accordance with this invention, pre-dawn control means responsive to the generation of the dawn and dusk signals, is operative for generating, at a morning turn-on time, a morning turn-on signal turning on the outdoor light before dawn and upon the elapse of a second predetermined time period after midday. In one advantageous embodiment, the morning turn-on signal is generated by referencing a timing means, e.g. a counter, after the elapse of the first predetermined time period. In another advantageous embodiment, the morning turn-on signal is generated by referencing the counter at midday.

In still further accordance with the present invention, manual electrical adjust means are provided for manually, electrically and adjustably setting the time durations of the first and the second predetermined time periods. This adjust means permits easy and rapid field adjustment and/or factory preadjustment of the nighttime turn-off time and the morning turn-on time for any particular outdoor light.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
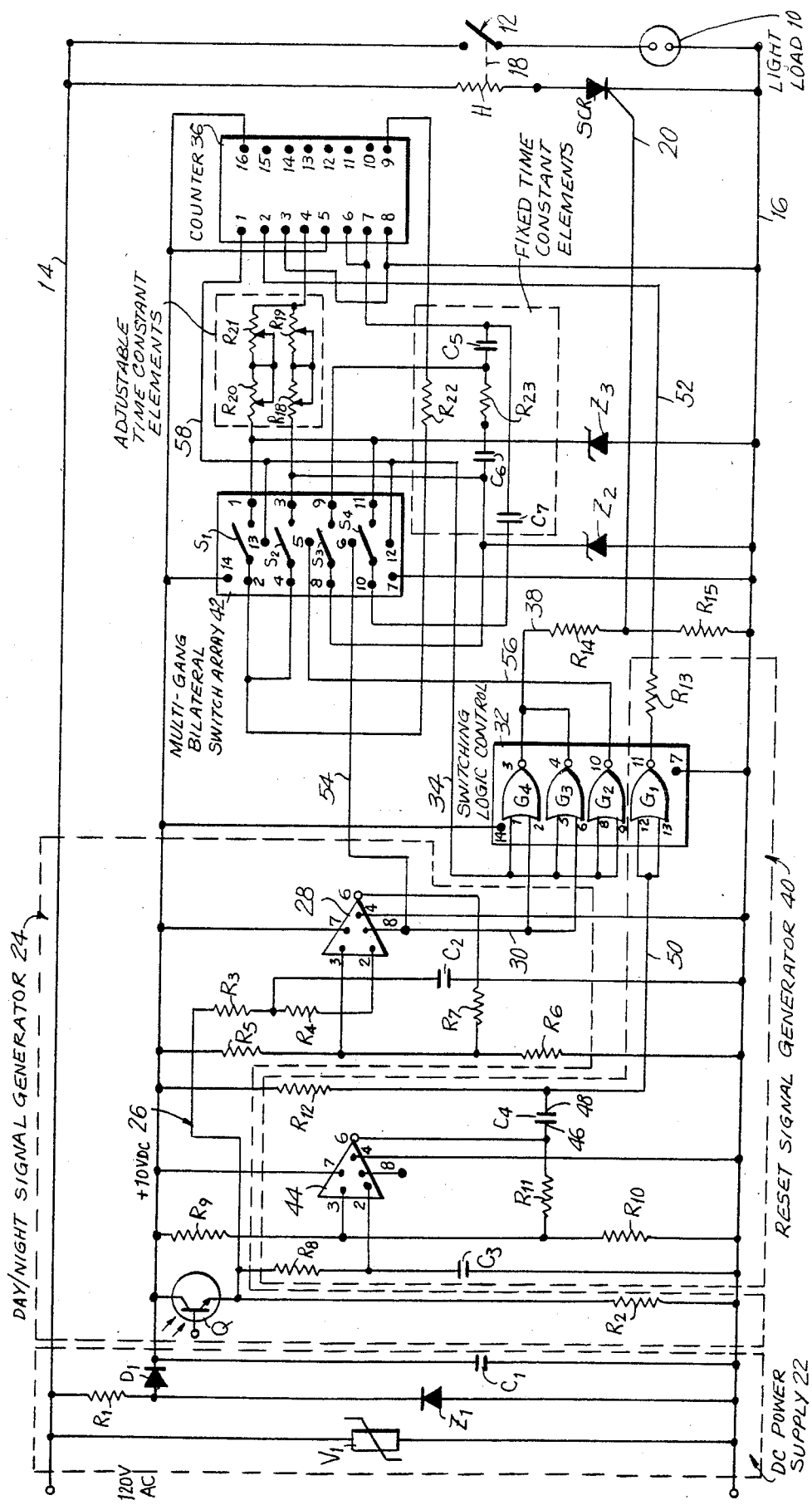
FIG. 1 is an electrical circuit schematic of a field-adjustable power control arrangement for outdoor lighting systems in accordance with a first embodiment of this invention.

Referring now to the drawings, and particularly to the embodiment of FIG. 1, reference numeral 10 generally identifies an outdoor lighting system such as a streetlighting load, a highway lighting load, and an area lighting load. Area lighting loads are typically parking lots, parks, building perimeters, advertising billboards and the like. Although only one light has been illustrated, it will be understood that any one particular outdoor lighting system may comprise a multitude of such lights.

Electrical power is supplied to the light system 10 by bus bars 14,16. A power control switch 12 is operatively connected between the power source and the light system 10 to either connect or disconnect the same from the power source. The power switch 12 is of the heat-sensitive normally-open type, and is operatively connected to a heater H along line-of-action 18. A silicon controlled rectifier SCR is connected across the bus bars 14,16 in series with the heater. The rectifier has a gate 20 which controls the flow of current through the rectifier, and hence, through the heater.

In operation, when no signal is present at gate 20, the rectifier will not conduct any current therethrough, and no current will flow through the heater. Hence, the switch 12 will stay open, and the light system will be extinguished, i.e. turned off. Conversely, when a trigger signal is present at gate 20, the rectifier will conduct current, and cause the current to flow through the heater, thereby causing the thermal switch 12 to close. The light system 10 is thus connected to the power source, and will be lit, i.e. turned on.

In accordance with this invention, the remaining electrical components depicted in FIG. 1 constitute a power control arrangement for generating a trigger signal at gate 20 for turning the light 10 on, or for not generating a signal at gate 20 for turning the light 10 off, all in accordance with an adjustable timing cycle as described below.

The power control arrangement comprises a DC power supply 22 operative for converting the 120 vAC power supply to a DC voltage, e.g. +10 vDC. The power supply includes a varistor $V_1$ for surge protection, a resistor $R_1$ for dropping the voltage to a lower magnitude, a zener diode $Z_1$ for clamping the voltage to the lower magnitude, a rectifier diode $D_1$ for rectifying the AC voltage, and a capacitor $C_1$ for filtering the output DC voltage.

The power control arrangement also comprises a day/night signal generator 24 or sensor means operative for sensing the ambient light intensity surrounding the light 10, for detecting dawn and dusk, for generating a day signal during the day from dawn to dusk, and for generating a night signal during the night from dusk to dawn. The sensor means includes a phototransistor or photocell $Q_1$ whose base is exposed to incident light in the circumambient region of the light 10, whose collector is connected to the 10 vDC supply, and whose emitter is connected to ground by dropping resistor $R_2$. An analog output signal from the photocell is taken off the emitter on conductor 26.

In operation, when the photocell detects a daytime condition, its impedance changes such that the analog output signal is above a predetermined threshold value, e.g. on the order of 7 vDC, to thereby constitute a day signal. When the photocell detects a nighttime condition, its impedance changes such that the analog output signal is below the threshold value to thereby constitute a night signal.

The analog day or night signal is conducted by conductor 26 through resistors $R_3$, $R_4$ to an input terminal 2 of a dual input differential amplifier 28 of the type manufactured by RCA as its Model No. CA3130. The differential amplifier 28 has a pair of voltage input terminals 2 and 3, a power supply terminal 7 connected to the 10 volt power supply, a ground terminal 4 connected to ground, a direct output terminal 8, and an inverted output terminal 6. A pair of voltages to be compared are inputed to terminals 2 and 3, and the direct output is taken from terminal 8, and the inverted output is taken from terminal 6.

A voltage divider comprising resistors $R_5$, $R_6$ is connected across the power supply to ground. The junction between the resistors $R_5$ and $R_6$ is directly connected to input terminal 3. As noted previously, the analog day or night signal is fed through resistors $R_3$ and $R_4$ to input terminal 2. The junction between the resistors $R_3$ and $R_4$ is connected to ground by a smoothing capacitor $C_2$ operative to prevent false triggering by delaying the analog signal for a predetermined time period before it reaches input terminal 2. A feedback loop having feedback resistor $R_7$ is connected between inverted output terminal 6 and input terminal 3.

The operation of the differential amplifier is as follows: At dawn and throughout the day until dusk is detected, the analog day signal which is above the aforementioned threshold value is conducted to input terminal 2. The analog day signal is then compared to the fixed reference voltage present on input terminal 3. The resistors $R_5$ and $R_6$ bias the differential amplifier to have a relatively low differential output signal. This low differential signal is necessary to be certain that dawn and dusk are reliably detected every day.

Under the daytime condition, there is no output signal at inverted output terminal 6, but there is an output signal at direct output terminal 8. This output signal is conducted along the output conductor 30 to dawn/dusk control means, as described below. Under the nighttime condition, i.e. at dusk and throughout the night until dawn is detected, the analog night signal, which is below the aforementioned threshold value, is conducted to input terminal 2, and then compared to the reference voltage at input terminal 3. In this case, there is no output signal at direct output terminal 8, but there is an output signal at inverted output terminal 6. This latter output signal is conducted by the feedback loop through feedback resistor $R_7$ back to input terminal 3. This places resistor $R_7$ in parallel with resistor $R_5$, thereby causing the voltage across resistor $R_5$ to decrease, and the voltage across resistor $R_6$ to increase. The increasing voltage on input terminal 3 accentuates the difference between the voltages at the input terminals 2 and 3, and affirmatively distinguishes the difference between the presence of an output signal on output conductor 30 during the daytime, and the absence of an output signal on output conductor 30 during the nighttime.

The differential amplifier 28 serves as a means for processing the analog day or night signal generated by the photocell, and for electronically converting the analog signal to a two-state, digital-type signal whose high state corresponds to a daytime condition, and whose low state corresponds to a nighttime condition.

The day/night signal on conductor 30 is then conducted to dawn/dusk control means which are constituted by NOR gates $G_3$ and $G_4$ on an integrated circuit chip 32 manufactured by RCA as its Model No. CD4001. The chip 32 has four NOR gates $G_1$, $G_2$, $G_3$ and $G_4$, each gate having a pair of input terminals and an output terminal. Terminals 14 and 7 are respectively connected to the DC power supply and ground. Two of the four NOR gates, i.e. $G_1$ and $G_2$, are used for the other control timing purposes as described below. The other two NOR gates, i.e. $G_3$ and $G_4$, are available for the dawn/dusk control means, although only one is necessary. Hence, as for the gates $G_3$ and $G_4$, the first input terminals 2 and 6, the second input terminals 1 and 5, and the output terminals 3 and 4, are each respectively tied together. The gates $G_3$ and $G_4$ are redundant and, in another advantageous construction, the output conductor which connects the output of gate $G_3$ to the output of gate $G_4$ can be omitted.

The digital day/night signal on conductor 30 is fed to the first input terminals 2 and 6 of gates $G_4$ and $G_3$. The other input terminals 1 and 5 of gates $G_4$ and $G_3$ are connected by a conductor 34 which is connected to a timer output terminal 1 of a timing means or counter 36. As will be explained in greater detail below, the timer output terminal 1 is in the low or counter-empty state at dawn, during the day, and at dusk.

Hence, at dawn, the first input terminals 2 and 6 of gates $G_4$ and $G_3$ are in the high state, whereas the second input terminals 1 and 5 of gates $G_4$ and $G_3$ are in the low state. The electronic processing provided by the NOR gates $G_4$ and $G_3$ thus causes no output signal to be conducted to the conductor 38 or to the gate 20, thereby causing the light 10 to be turned off. During the daytime, the same situation prevails at the terminals of gates $G_3$ and $G_4$. Hence, the light 10 is maintained off.

However, at dusk, the first input terminals 2 and 6 of gates $G_4$ and $G_3$ are in the low state, while the second input terminals 1 and 5 of gates $G_4$ and $G_3$ remain in the low state. The electronic processing provided by the gates $G_3$ and $G_4$ thus causes an output signal to be conducted to the conductor 38 and to be reduced in magnitude by the voltage divider which consists of resistors $R_{14}$ and $R_{15}$. The reduced magnitude output signal is still sufficient to trigger the gate 20 and turn the light on. At other times during the nighttime, the timer signal on conductor 34 will control the further turning off and on of the light, as explained below.

The power control arrangement also comprises post-dusk control means for generating a nighttime turn-off signal for turning off the light at a nighttime turn-off time which is after dusk, and also comprises pre-dawn control means for generating a morning turn-on signal for turning on the light at a morning turn-on time which is before dawn. By way of example, if dawn is assumed to occur at 6:00 A.M. and dusk is assumed to occur at 6:00 P.M., then the nighttime turn-off time would occur after dusk, e.g. at 11:00 P.M., and the morning turn-on time would occur before dawn, e.g. at 5:00 A.M. The turning off of the outdoor lighting system, particularly an area lighting system, after dusk at 11:00 P.M. is to conserve electrical energy, particularly in areas, such as parks, which are not utilized after 11:00 P.M. The turning on of the outdoor lighting system, particularly an area lighting system, before dawn at 5:00 A.M. is to provide additional illumination to other outdoor lighting systems to assist traffic flow, particularly in the wintertime. It will be understood that the above times are merely exemplary and have been provided merely for ease of description. Other times are, of course, within the spirit of this invention.

Turning first to the post-dusk control means, the nighttime turn-off time is established upon the elapse of a first predetermined time period which must start at some convenient reference point. Dawn and dusk are not convenient time reference points, because they vary daily and seasonally. Despite the variation of the times when dawn and dusk individually occur, the midday time, which is substantially midway between dawn and dusk, is daily and seasonally approximately the same. Hence, in summer when dawn occurs earlier, and dusk occurs later, to make a longer day, the midday time occurs at around noon. In winter, when dawn occurs later, and dusk occurs earlier, to make a shorter day, the midday time again occurs around noon. Hence, midday is a convenient reference point from which to start measuring the first predetermined time period, at the conclusion of which the nighttime turn-off time occurs. As for the pre-dawn control means of FIG. 1, the morning turn-on time is established upon the elapse of a second predetermined time period which uses the end of the first predetermined time period as a convenient starting point to actuate a timer. As for the pre-dawn control means of FIG. 2, the morning turn-on time is established upon the elapse of a second predetermined time period which uses midday as a convenient starting point to reference a timer.

A timer, e.g. an up-and down-counter 36, is shared by the post-dusk control means and by the pre-dawn control means of FIG. 1. The post-dusk control means uses the upcounting feature of the counter, whereas the pre-dawn control means utilizes the downcounting feature. The counter is preferably an integrated circuit chip of the type manufactured by the Motorola Corporation as its Model No. MC14521AL. The counter has a built-in oscillator which oscillates at the frequency determined by the time constant elements connected across its oscillator output terminals 4, 6, 7 and 9. Terminals 16 and 8 are respectively connected to the DC power supply and ground. Timer output terminal 1 supplies a two-state timer output signal on conductor 34. Reset terminal 2 is used to receive a reset signal from the reset signal generator 40, as described below.

The counter 36 has a built-in set of flip-flops arranged in series, and operative to upcount a number of pulses, i.e. counts, from a counter-empty condition to a counter-full condition in accordance with an upcount characteristic. Similarly, the counter 36 has a downcount characteristic, wherein it is operative to downcount a number of pulses from a counter-full condition to a counter-empty position. In either the upcount or downcount mode of operation, the built-in oscillator determines the rate at which the flip-flops will generate each pulse, i.e. the upcount or downcount frequency characteristic of the counter. The upcount frequency characteristic and the upcount characteristic together determines a first predetermined time period, which will be used to determine the nighttime turn-off time. The downcount frequency characteristic and the downcount characteristic together define a second predetermined time period, which will be used to determine the morning turn-on time.

Turning then to the determination of the nighttime turn-off time, it will be recalled that midday is a convenient reference point from which to reference the counter. However, the photocell cannot directly detect midday, but can only directly detect dawn and dusk. Hence, the power control arrangement of this invention starts the counter at dawn to upcount at a daylight frequency, e.g. 97 Hz. This daylight frequency is maintained all day long, i.e. from dawn to midday and from midday to dusk. At dusk, the counter frequency is changed to a nighttime frequency, e.g. 194 Hz, which is double the daylight frequency. The nighttime frequency is maintained until the counter is full, which is defined as the nighttime turn-off time. Starting a counter at dawn and running it at one-half of a rated frequency until dusk, and thereupon running it at the rated frequency until the nighttime turn-off time, has been found to be the equivalent of starting the counter at midday at the rated frequency and running it at the rated frequency until the nighttime turn-off time.

As for the morning turn-on time, the nighttime turn-off time is a convenient reference point from which to start the counter to downcount until it reaches its counter-empty condition, which defines the morning turn-on time. The downcount or morning turn-on frequency can be any value, and we have found it convenient to choose it to be four times the daylight frequency, e.g. 388 Hz.

Frequency control means are provided for operating the counter 36 at the correct frequency and at the correct times. The frequency control means includes a set of adjustable time constant elements, including potentiometers $R_{18}, R_{19}, R_{20}, R_{21}$, a set of fixed time constant elements, including resistors $R_{22}$ and $R_{23}$ and capacitors $C_5$, $C_6$ and $C_7$; and switching means for connecting the correct time constant elements to the counter at the correct times. The switching means includes a multi-gang bilateral switch array 42 and NOR gate $G_2$ of the switching logic control chip 32. The bilateral switch 42 is preferably an integrated circuit chip of the type manufactured by RCA as its Model No. CD4066. The bilateral switch 42 constitutes a set of four normally-open switches $S_1, S_2, S_3$ and $S_4$ which are respectively closed when a high state signal is present at control terminals 13, 5, 6 and 12. Zener diode $Z_2$ is connected between terminals 3,8 of switch 42 and ground, and zener diode $Z_3$ is connected between terminals 1,11 of switch 42 and ground, for stability of operation.

Before describing the operation of the frequency control means in detail, the operation of the reset signal generator 40 will be discussed. The reset signal generator 40 comprises a dual input differential amplifier 44 similar to the above-described differential amplifier 28, except that the direct output terminal 8 is not used. The first input terminal 2 is connected by voltage-dropping resistor $R_8$ to the output conductor 26 of the photocell. A reference voltage is supplied to the second input terminal 3 at the junction between the resistors $R_9$ and $R_{10}$ which together constitute a voltage divider. Terminals 7 and 4 are respectively connected to the DC power supply and ground. The resistors $R_9$ and $R_{10}$ bias the reset amplifier 44 to have a large differential output signal at the inverted output terminal 6. This large differential output signal is used to affirmatively distinguish between mere cloud cover and dusk. A feedback loop connects the output terminal 6 to the input terminal 3 by feedback resistor $R_{11}$.

The inverted output of reset amplifier 44 is conducted to one plate 46 of a pulse-generating capacitor $C_4$. The other plate 48 of capacitor $C_4$ is connected to the 10 vDC power supply through the resistor $R_{12}$ which is very large in magnitude so that the plate 48 has approximately 10 volts thereat in steady state operation.

At night, as described above, the photocell generates an analog night output signal which is below the aforementioned threshold value. This output signal is fed to input terminal 2, and is then compared with the reference voltage which, in the preferred embodiment, is pre-set by the voltage divider resistors $R_9$ and $R_{10}$ to about 5 vDC. An output signal is generated at inverted output terminal 6 which, in steady state operation, applies a 10 v voltage at plate 46. Inasmuch as plate 48 is also applied with a 10 v voltage in steady state operation, no current flows through the capacitor $C_4$ to charge the same.

At dawn, the photocell generates an analog day output signal which is above the aforementioned threshold value. The day signal is fed to input terminal 2, is compared with the reference voltage at terminal 3, and no output signal is generated at output terminal 6. This causes the voltage at plate 48 to suddenly drop from 10 volts to 0 volts, and current to flow to the capacitor $C_4$ to charge the latter. The 0 volt, i.e. low voltage state, signal at plate 48 is conducted along conductor 50 to both input terminals 12 and 13 of the reset NOR gate $G_1$, thereby generating a high voltage state at output terminal 11. The high voltage state signal at output terminal 11 is conducted through resistor $R_{13}$ along conductor 52 to reset terminal 2 on the counter 36. The reset signal is operative to reset the counter no matter whether it is upcounting or downcounting. The reset signal is only automatically generated at dawn of each day.

The operation of the power control arrangement for a complete timing cycle is as follows: At dawn, the photocell detects dawn and generates a dawn signal which is conducted to input terminal 2 of reset amplifier 44 and to input terminal 2 of the differential amplifier 28. As described above, the reset amplifier 44 momentarily generates a low state signal at both input terminals 12,13 of gate $G_1$, thereby causing a reset signal to be conducted along conductor 52 to the reset terminal 2 of the counter 36. The reset signal clears the counter. Hence, the timer output signal at the timer output terminal 1 of the counter is in the low state.

As also described above, the differential amplifier 28 generates at the direct output terminal 8 a high state signal which is conducted by conductor 54 to control terminal 6 of the bilateral switch 42, thereby causing switch $S_3$ to close. The closed switch $S_3$ shorts out the resistor $R_{23}$ and the capacitor $C_6$. Inasmuch as the timer output signal on conductor 58 is now at the low state, switches $S_1$ and $S_4$ remain open. The timer output signal on conductor 58 is also conducted along conductor 34 to both inputs of gate $G_2$, wherein it is processed to produce a high state signal on conductor 56, thereby causing switch $S_2$ to close. Hence, the counter now has time constant elements $R_{19}$, $R_{18}$, and $R_{22}$ between its oscillator output terminals 4 and 9, and also has time constant element $C_5$ between oscillator output terminals 4 and 6, 7. The values of these resistors and capacitors are chosen to cause the oscillator to start counting at the daylight frequency, e.g. 97 Hz. The low state of the timer output signal on conductor 34 is also applied to the input terminals 1 and 5 of gates $G_4$ and $G_3$, thereby causing a low state signal to be generated on conductor 38. This low state signal is conducted to the gate 20, thereby turning off the light 10 at dawn.

From dawn to dusk, the photocell still detects a day signal, and all the components of the power control arrangement continue to operate as described above for the dawn condition, except that the reset signal generator no longer generates a reset signal on conductor 52. Instead, as described above, a steady state condition prevails, and both inputs 12 and 13 of gate $G_1$ are at the high state, thereby producing a low or no-reset signal on the conductor 52 for conduction to reset terminal 2. The counter continues to count at the aforementioned daytime frequency which is determined by time constant elements $R_{18}$, $R_{19}$, $R_{22}$ and $C_5$.

At dusk, the photocell generates a low state dusk signal at input terminal 2 of the reset amplifier 44 and at input terminal 2 of the differential amplifier 28. The reset amplifier 44 generates at its inverted output terminal 6 a high state signal at plate 46 of the capacitor $C_4$, and plate 48 thereof remains in the high state. Hence, both inputs 12 and 13 of gate $G_1$ are high, and the output on conductor 52 is low, thereby causing a no-reset signal to be generated on conductor 52. The counter 36 continues to count.

However, the counter frequency has been changed at dusk to be double the daytime frequency. At dusk, the differential amplifier 28 generates a low state signal at its direct output terminal 8, and this low signal is conducted to control terminal 6 of the switch 42 to open the previously—closed switch $S_3$. This causes the time constant elements $R_{23}$ and $C_6$ to be inserted back across the oscillator output terminals. Since the counter 36 has not reached its counter-full condition at dusk, the timer output signal on conductor 34 remains in the low state, and does not change the open status of switches $S_1$ and $S_4$. The low timer output signal is conducted along conductor 34 to both input terminals of gate $G_2$, thereby causing a high signal to be conducted along conductor 56 to control terminal 5, thereby maintaining switch $S_2$ in a closed status. Hence, the time constant elements $R_{18}$, $R_{19}$ and $R_{22}$ are still connected between oscillator output terminals 4 and 9, and the time constant elements $R_{23}$, $C_5$ and $C_6$ are connected between oscillator output terminals 4 and 6, 7. Inasmuch as capacitors $C_5$ and $C_6$ are connected in series and are chosen to be approximately equal, the addition of capacitor $C_6$ to the time constant circuit causes the nighttime oscillation frequency to be double that of the daytime frequency. The low timer output signal on conductor 34 is conducted to input terminals 1 and 5 of gates $G_4$ and $G_3$, and with the other input terminals 2 and 6 of gates $G_4$ and $G_3$ also being in the low state at dusk, the output signal on conductor 38 is high, thereby causing the gate 20 to trigger the rectifier and to turn the light 10 on at dusk.

From dusk to the nighttime turn-off time, the photocell still detects a night signal, and all the components of the power control arrangement continue to operate as described above for the dusk condition. The light 10 remains on, and the counter 36 continues to count at the nighttime frequency.

At the nighttime turn-off time, the photocell still continues to generate a night signal. Hence, the reset signal generator continues to generate a low state no-reset signal on conductor 52, and the differential amplifier 28 still continues to generate a low state dusk signal on conductors 30 and 54. The low state signal on conductor 54 maintains the switch $S_3$ in the open status.

However, at the nighttime turn-off time, the counter is full, and the counter generates a high state timer output signal at its output terminal 1. The high timer output signal on conductor 58 is conducted to control terminals 13 and 12, thereby closing their respective switches $S_1$ and $S_4$. The high timer output signal is also conducted on conductor 34 to both input terminals 8 and 9 of gate $G_2$, thereby generating a low state signal on conductor 56. This low state signal is applied to control terminal 5, thereby causing switch $S_2$ to be in open status. As a result of this switching configuration, the time constant resistors $R_{20}$, $R_{21}$ and $R_{22}$ are connected between oscillator output terminals 4 and 9, and the time constant capacitor $C_7$ is connected between oscillator output terminals 4 and 6, 7. These time constant elements determine a downcount frequency which preferably is chosen to be faster than the aforementioned nighttime frequency. The high timer output signal on conductor 34 is also applied to input terminals 1 and 5 of gates $G_4$ and $G_3$ which, with the presence of a low state signal from conductor 30 on the other input terminals 2 and 6 of gates $G_4$ $G_3$, generate a low state signal on conductor 38 which, as described earlier, turns the light 10 off.

From the nighttime turn-off time to the morning turn-on time, the photocell still detects a night signal, and all the components of the power control arrangement continue to operate as described before for the nighttime turn-off condition. The counter continues to downcount at the downcount frequency.

At the morning turn-on time, the photocell still continues to generate a night signal. The reset signal generator continues to generate a low state no-reset signal. The differential amplifier 28 still continues to generate a low state dusk signal on conductors 30 and 54. The low state signal on conductor 54 causes the switch $S_3$ to stay open. However, in contrast to the nighttime turn-off condition, the timer output signal on conductor 58 is now in the low state. This causes switches $S_1$ and $S_4$ to open. The low timer output signal is conducted along conductor 34 to both inputs of gate $G_2$ to generate a high signal on conductor 56, thereby causing switch $S_2$ to close. As a result of this switching, the time constant elements $R_{18}$, $R_{19}$ and $R_{22}$ are connected between oscillator output terminals 4 and 9, and the time constant elements $R_{23}$, $C_5$ and $C_6$ are respectively connected between the oscillator output terminals 4 and 6, 7. This is conveniently chosen to be the same frequency as the aforementioned nighttime frequency. The low timer output signal is conducted along conductor 34 to input terminals 1 and 5 of gates $G_4$ and $G_3$ which, with the presence of a low state dusk signal from conductor 30 on the other input terminals 2 and 6 of gates $G_4$ and $G_3$, generate a high state signal on conductor 38 which, as described earlier, turns the light 10 on.

From the morning turn-on time to dawn, the same situation prevails as at the morning turn-on time. The counter 36 continues to count up at the night frequency. At dawn, the reset signal is again generated, and the counter 36 is cleared. The timing cycle repeats itself daily as described above.

In accordance with the invention, manual electrical adjust means are provided for manually, electrically and adjustably setting the nighttime turn-off time and/or the morning turn-on time so as to permit easy and rapid adjustment in the field and/or pre-adjustment at the manufacturing site. This is accomplished by changing the time durations of the aforementioned first and second predetermined time periods. Inasmuch as the counter is used to establish these time periods, the time durations can be changed by either varying the frequency and/or the count of the counter. The FIG. 1 embodiment changes the duration of the first and second time periods by changing the frequency, preferably in a continuous, infinitely variable, analog manner. By contrast, the FIG. 2 embodiment changes the duration of the first and second time periods by changing the count, preferably in a digital manner.

In FIG. 1, the adjustment of the first and second time periods is achieved by constituting the time constant elements $R_{18}$, $R_{19}$, $R_{20}$ and $R_{21}$ as potentiometers with manual wiper arms. The potentiometers $R_{18}$ and $R_{19}$ control the nighttime turn-off time. The potentiometers $R_{20}$ and $R_{21}$ control the morning turn-on time. Potentiometers $R_{18}$ and $R_{20}$ are located within a housing which contains the power control arrangement for interior manual factory adjustment. The potentiometers $R_{19}$ and $R_{21}$ are located exteriorly of the housing for exterior manual field adjustment.

In the embodiment of FIG. 1, the circuit elements preferably have the following values: As for the resistors $R_1$ through $R_{15}$, they are 18, 22, 470, 100, 470, 33, 330, 1500, 180, 180, 10, 2200, 1.5, 15 and 8.2 kilohms, respectively. As for the potentiometers $R_{18}$, $R_{19}$, $R_{20}$ and $R_{21}$, they are provided with a 500, 250, 200, and 250 kilohm range, respectively. As for resistors $R_{22}$ and $R_{23}$, they are 1 megohm and 200 ohms, respectively. The heater includes a five kilohm resistor. As for the capacitors $C_1$ through $C_7$, they are 220, 3.3, 3.3, 0.012, 0.015, 0.015 and 0.0082 microfarads, respectively. Each of the zener diodes is a Model No. IN758A device. The diode $D_1$ is a IN4007 device. The rectifier is a C106 device. The photocell is a transistor bearing Model No. CLT2030.

Figure 2:
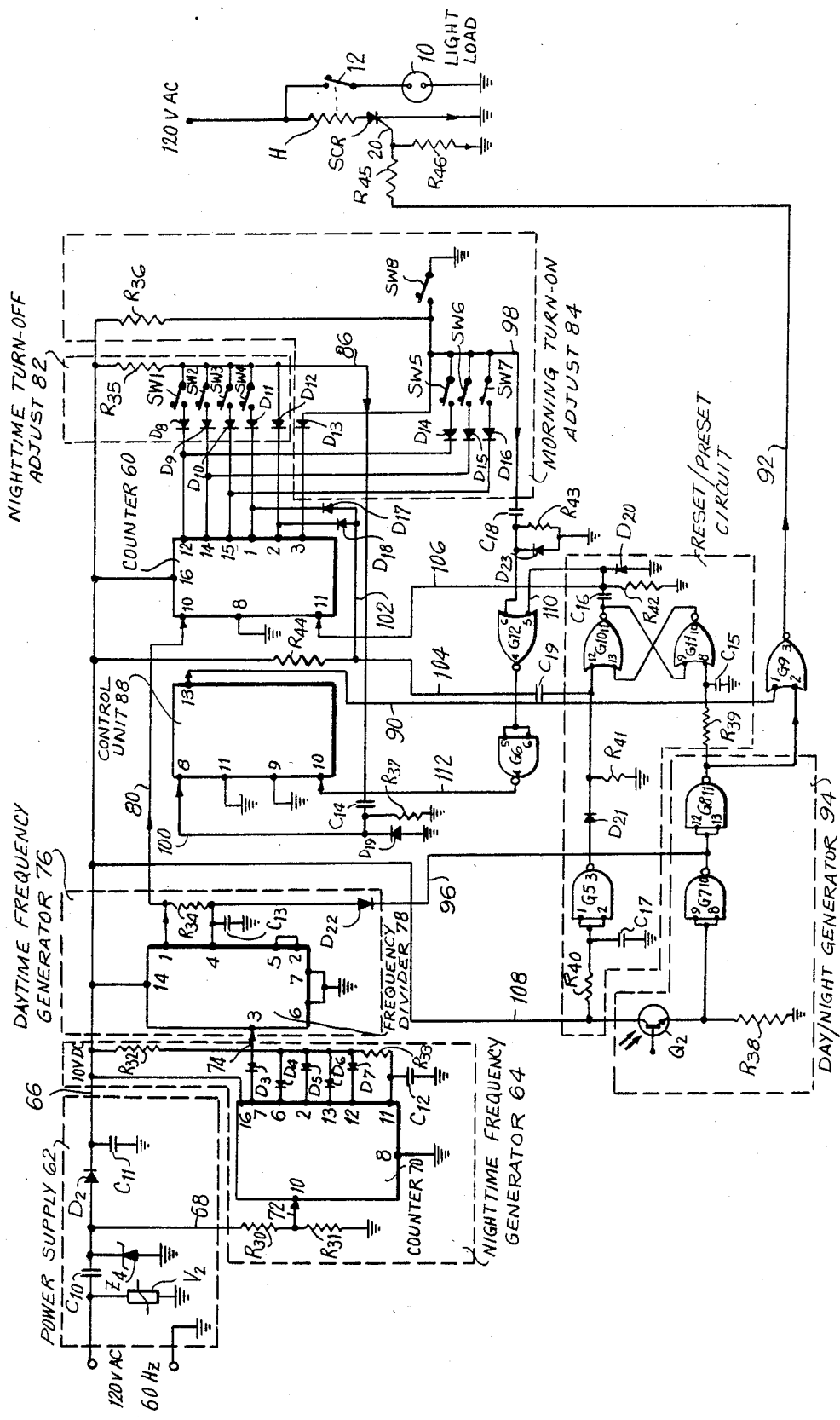
FIG. 2 is an electrical circuit schematic of a field-adjustable power control arrangement in accordance with a second embodiment of this invention.

Turning then to the FIG. 2 embodiment, one essential difference between it and the FIG. 1 embodiment is that the count of the timing counter 60 of FIG. 2 is varied, rather than varying the oscillation frequency of the counter. Otherwise, the theory of operation is basically the same, in that the counter begins counting at a daytime frequency which starts at dawn and continues through the day. Thereupon, at dusk, the counter continues to count, but at a nighttime frequency which is double the daytime frequency. When the counter reaches a first predetermined count, this defines the nighttime turn-off time. However, in contrast to the FIG. 1 embodiment wherein the counter thereupon starts to downcount from the nighttime turn-off time to define the morning turn-on time, the counter 60 of the FIG. 2 embodiment continues to upcount at the nighttime frequency until it reaches a second predetermined count, which defines the morning turn-on time.

As shown in FIG. 2, a power supply 62 is operative to generate a 10 volt DC signal for energizing the various circuit components, and to generate an 8 volt AC signal at 60 Hz for the nighttime frequency generator 64. The power supply includes a varistor $V_2$ for surge protection, a voltage-dropping capacitor $C_{10}$ for dropping the 120 volt AC input voltage to about 10 volts AC, a zener diode $Z_4$ for clamping the voltage at 10 volts AC, a diode $D_2$ for rectifying the AC voltage, and a filter capacitor $C_{11}$ for removing voltage ripples. The 10 volt DC voltage is outputed on bus bar 66. The nighttime frequency generator 64 includes conductor 68 which conducts the 10 volt AC signal at 60 Hz to the voltage divider resistors $R_{30}$ and $R_{31}$ so as to drop the voltage to a value, e.g. on the order of 8 volts, sufficient to trigger the counter 70 at its input clock terminal 10.

The counter 70 is operative to convert the input signal at 60 Hz on input conductor 72 to a nighttime pulse signal having a frequency on the order of about 1 pulse per 7 seconds or so on output conductor 74. A suitable counter for this purpose is an integrated circuit chip manufactured by the RCA Corporation as its Model No. 4040. Power terminals 16 and 8 are respectively connected to the bus bar 66 and ground. Terminals 7,6,2,13 and 12 are respectively connected by diodes $D_3$, $D_4$, $D_5$, $D_6$ and $D_7$ to the bus bar 66 by voltage-dropping resistor $R_{32}$. Terminal 11 is connected to ground through capacitor $C_{12}$, and is connected to output conductor 74 through resistor $R_{33}$. The nighttime pulse signal on conductor 74 is conducted to a daytime frequency generator 76.

The daytime frequency generator 76 includes a frequency divider 78 operative for converting the nighttime pulse signal on conductor 74 to a daytime pulse signal having a frequency on the order of about 1 pulse per 14 seconds or so on output conductor 80 during the daytime, and for outputing the nighttime pulse signal on output conductor 80 during the nighttime. The daytime frequency is one-half the nighttime frequency. A suitable frequency divider for this purpose is one-half of an integrated circuit chip manufactured by the RCA Corporation as its Model No. 4013. Power terminals 14 and 7 are respectively connected to the bus bar 66 and ground. Terminal 6 is also connected to ground. Terminals 2 and 5 are tied together. The nighttime pulse signal is inputed at clock input terminal 3, and the nighttime pulse signal or the daytime pulse signal is outputed at output terminals 1 and 4 on output conductor 80. Output terminal 4 is connected to ground through capacitor $C_{13}$. Resistor $R_{34}$ is connected across output terminals 1 and 4. The presence of the nighttime or the daytime pulse signal on output conductor 80 is determined by the presence or absence of a control signal on control conductor 96 at output terminal 4. As will be shown below, this control signal on conductor 96 is responsive to the detection of a nighttime or daytime condition by the day/night generator 94, and this control signal is operative to make the frequency divider inoperative at night, to thereby output only the nighttime pulse signal on conductor 80. When the day/night signal generator 94 detects a daytime condition, the control signal is operative to energize the frequency divider during the day, to thereby output only the daytime pulse signal on the conductor 80.

The daytime or nighttime pulse signal is conducted along conductor 80 to the input clock terminal 10 of the counter 60. The counter 60 is operative to upcount at the frequency determined by the incoming signal up to a first predetermined count to define the nighttime turn-off time which is determined by the manual setting of the nighttime turn-off adjust circuit 82. The counter 60 is also operative to upcount at the incoming signal frequency up to a second predetermined count to define the morning turn-on time which is determined by the manual setting of the morning turn-on adjust circuit 84.

A suitable counter for this purpose is an integrated circuit chip manufactured by the RCA Corporation as its Model No. 4020. Terminals 16 and 8 are respectively connected to the bus bar 66 and ground. Time setting terminals 12, 14, 15 and 1 are respectively connected through diodes $D_8$, $D_9$, $D_{10}$, and $D_{11}$ and respectively through normally-open manual adjust switches $SW_1$, $SW_2$, $SW_3$ and $SW_4$, and through resistor $R_{35}$ to the bus bar 66. Initial time terminal 2 is connected through diode $D_{12}$ and through resistor $R_{35}$ to the bus bar 66. The nighttime turn-off adjust circuit 82 constitutes a nighttime turn-off adjust means for manually, electrically and adjustably setting the nighttime turn-off time by opening and/or closing the switches $SW_1$, $SW_2$, $SW_3$ and $SW_4$.

Time setting terminals 12, 14 and 15 are also respectively connected through diodes $D_{14}$, $D_{15}$ and $D_{16}$ and respectively through normally-open manual adjust switches $SW_5$, $SW_6$ and $SW_7$ and through resistor $R_{36}$ to the bus bar 66. Initial time terminal 3 is connected through diode $D_{13}$ and through resistor $R_{36}$ to the bus bar 66. A bypass switch $SW_8$ is connected between the resistor $R_{36}$ and ground. The morning turn-on adjust circuit 84 constitutes a morning turn-on adjust means for manually, electrically and adjustably setting the morning turn-off time by opening and/or closing the switches $SW_5$, $SW_6$ and $SW_7$.

The counter 60 is normally operative to generate a low state signal at terminals 12, 14, 15, 1, 2 and 3, except at respective predetermined times when a high state signal is generated at the aforementioned terminals. In a preferred embodiment, a high state signal is generated at terminals 12, 14, 15, 1, 2 and 3 upon the elapse of one-half hour, one hour, 2 hours, 4 hours, 8 hours and 16 hours, respectively, after midday, which is centrally established between dawn and dusk by the daytime and nighttime pulse signals fed to input terminal 10 of the counter 60.

The low state at the initial time terminal 2 normally shorts the resistor $R_{35}$ to ground, and generates a low state signal on output conductor 86. At about 8 hours after midday, the initial time terminal 2 goes high, and generates a high state signal on output conductor 86. If midday is assumed to be noon, then the nighttime turn-off time is 8:00 P.M. If it is desired to adjust the nighttime turn-off time to be other than 8:00 P.M., then the switches $SW_1$, $SW_2$, $SW_3$ and $SW_4$ can be individually closed to adjust the nighttime turn-off time by adding one-half, one, two and four hours, respectively. Of course, more than one switch can be closed for any one particular setting, and different time increments could have been selected.

In analogous manner, the low state at the initial time terminal 3 normally shorts the resistor $R_{36}$ to ground, and generates a low state signal on output conductor 98. At about 16 hours after midday, the initial time terminal 3 goes high, and generates a high state signal on output conductor 98. If midday is assumed to be noon, then the morning turn-on time is 4:00 A.M. If it is desired to adjust the morning turn-on time to be other than 4:00 A.M., then the switches $SW_5$, $SW_6$ and $SW_7$ can be individually closed to adjust the morning turn-on time by adding one-half, one and two hours, respectively. Of course, more than one switch can be closed for any one particular setting, and different time increments could have been selected. The closing of the bypass switch $SW_8$ will cause the morning turn-on feature to be omitted, if desired, at any particular installation.

The digital control over the operation of the counter 60 is more preferable than the counter operation in the FIG. 1 embodiment in the sense that the latter uses time constant resistors and capacitors which are temperature sensitive. Of course, the analog adjustment of the FIG. 1 embodiment provides for more fine control over the timing cycle.

Hence, the counter 60 generates at the nighttime turn-off time an output signal which changes from a low to a high state at the aforementioned first predetermined count. This output signal is conducted along output conductor 86 to a pulse-generating sub-circuit comprised of the pulse capacitor $C_{14}$, the resistor $R_{37}$ and the diode $D_{19}$. This pulse-generating sub-circuit detects the change of the output signal on conductor 86, and generates a timer output pulse signal corresponding to the nighttime turn-off time. This timer output pulse signal is conducted along conductor 100 to input terminal 8 of a control unit 88. The control unit 88 is a flip-flop device, and is preferably constituted by the other half of the aforementioned integrated circuit chip manufactured by the RCA Corporation as its Model No. 4013. Terminals 9 and 11 are grounded. The high state of the timer output pulse signal at the input terminal 8 causes a nighttime turn-off signal having a high state to be generated on output conductor 90. The high state nighttime turn-off signal is conducted to input terminal 1 of a NOR gate $G_9$ operative, as described below, to process the high state nighttime turn-off signal, and to generate a low state cut-off signal on conductor 92. This low state cut-off signal is conducted to a voltage divider comprised of resistors $R_{45}$ and $R_{46}$, to thereby apply a low state signal at the gate 20 of the silicon controlled rectifier SCR. As described above, this condition stops current from flowing through the heater H, and turns off the light 10.

The counter 60 also generates at the morning turn-on time an output signal which changes from a low to a high state at the aforementioned second predetermined count. This signal is conducted along conductor 98 to a pulse-generating sub-circuit comprised of the pulse capacitor $C_{18}$, the resistor $R_{43}$ and the diode $D_{23}$. This pulse-generating circuit detects the change of the output signal on conductor 98, and generates a timer output pulse signal corresponding to the morning turn-on time. This timer output pulse signal is conducted to input terminal 6 of a NOR gate $G_{12}$, whose output terminal 4 is connected to both input terminals 5 and 6 of a NAND gate $G_6$, whose output terminal 4 is, in turn, connected to the other input terminal 10 of the control unit 88. The high state of the timer output pulse signal on conductor 98 is processed by the gates $G_{12}$ and $G_6$, as described below, to generate a high state reset signal at input terminal 10 of the control unit 88. This high state reset signal causes a morning turn-on signal having a low state to be generated on output conductor 90. The low state morning turn-on signal is conducted to input terminal 1 of the NOR gate $G_9$ which is operative, as described below, to process the low state morning turn-on signal, and to generate a high state turn-on signal on conductor 92. This high state turn-on signal is applied to the gate 20 of the silicon controlled rectifier SCR and, as described above, the rectifier is triggered into conduction, and the light 10 is turned on.

Before discussing the operation of the control gates $G_5$ through $G_{12}$ in detail, it is appropriate to describe the operation of the day/night signal generator 94. The day/night signal generator 94 includes a phototransistor $Q_2$ that detects ambient light conditions in the same manner as described earlier for the phototransistor $Q_1$. The collector of the phototransistor $Q_2$ is connected to the bus bar 66, and is also connected through resistor $R_{40}$ and capacitor $C_{17}$ to both input terminals 1 and 2 of a NAND gate $G_5$. The gate $G_5$ is one-fourth of an integrated circuit chip having three other gates, namely NAND gates $G_6$, $G_7$ and $G_8$. A suitable chip for this purpose is one manufactured by the RCA Corporation as its Model No. 4093. The emitter of the phototransistor $Q_2$ is connected to both input terminals 8 and 9 of the gate $G_7$, and is grounded through resistor $R_{38}$. The output terminal 10 of gate $G_7$ is connected to both input terminals 12 and 13 of gate $G_8$. The output terminal 11 of gate $G_8$ is connected to input terminal 2 of the gate $G_9$.

When the phototransistor $Q_2$ detects daytime, a high state signal is generated at the emitter, and a high state signal is also generated at the input terminal 2 of gate $G_9$. During the daytime, the output terminal 13 of the control unit will be at the low state so that the other input terminal 1 of the gate $G_9$ will also be at the low state. The gate $G_9$ processes these input signals to generate a day signal having a low state on output conductor 92. The low state day signal does not trigger the rectifier into conduction, and the light 10 is turned off.

When the phototransistor $Q_2$ detects nighttime, a low state signal is generated at the emitter and at the input terminal 2 of gate $G_9$. The input terminal 1 of the gate $G_9$ is at the low state during the nighttime, prior to the nighttime turn-off time. Hence, the gate $G_9$ processes these input signals to generate a night signal having a high state on output conductor 92. The high state night signal triggers the rectifier into conduction, and the light 10 is turned on.

At the nighttime turn-off time, the signal at output terminal 13 of the control unit 88 goes high, which in turn causes input terminal 1 of the gate $G_9$ to go high. The low state at the other input terminal 2 of the gate $G_9$ causes a nighttime turn-off signal having a low state to be conducted along conductor 92, to thereby turn the light off at the nighttime turn-off time.

Analogously at the morning turn-on time, the signal at output terminal 13 of the control unit 88 is changed back to the low state due to the low state control signal at input terminal 10 of the control unit 88. The low signal at input terminal 1 of the gate $G_9$, together with the low state at the other input terminal 2 of the gate $G_9$, causes a morning turn-on signal having a high state to be conducted along conductor 92, to thereby turn the light on at the morning turn-on time.

Every day at dawn, it is desired to reset the counter 60 and the control unit 88. As a safety feature, the reset function is not implemented unless a pre-set latching condition has occurred prior to dawn. In order to establish the pre-set latching condition and detect whether or not it has occurred, a pre-set control sub-circuit is provided, which includes a pair of latching NOR gates $G_{10}$ and $G_{11}$ which are one-half of an integrated circuit chip having two other NOR gates, namely gates $G_9$ and $G_{12}$.

A suitable chip for this purpose is one manufactured by the RCA Corporation as its Model No. 4001.

The pre-set latching condition can be set at any time prior to dawn. In a preferred embodiment, we have chosen 12 hours after midday, i.e. about midnight, to set the latching condition. Hence, the cathodes of the diodes $D_{17}$ and $D_{18}$ are respectively connected to output time terminals 1 and 2 of the counter 60, and the anodes of the diodes $D_{17}$ and $D_{18}$ are connected together to conductor 102. Conductor 104 conducts the high voltage on the bus bar 66 through the voltage-dropping resistor $R_{44}$ to the conductor 102, and through the pulse capacitor $C_{19}$ to the input terminal 12 of gate $G_{10}$. Hence, at twelve hours after midday, the time output terminals 1 and 2 of the counter 60 will automatically change from the low to the high state, and this change will cause the pulse capacitor $C_{19}$ to generate a high pulse at input terminal 12 of the gate $G_{10}$.

The input terminal 12 of the gate $G_{10}$ is normally maintained in the low state during steady state operation during the daytime and the nighttime. A conductor 108 from the bus bar 66 conducts the high state signal through a time delay circuit composed of resistor $R_{40}$ and capacitor $C_{17}$ to both input terminals 1 and 2 of gate $G_5$. The output terminal 3 of gate $G_5$ is connected through diode $D_{21}$ to the input terminal 12 of the gate $G_{10}$. A resistor $R_{41}$ is connected between the input terminal 12 and ground. Hence, the high state signal applied to the inputs of gate $G_5$ is processed by the latter to a low state which is directly applied to the input terminal 12 of gate $G_{10}$.

As noted previously, the input terminal 8 of the gate $G_{11}$ which is connected through a time delay circuit composed of resistor $R_{39}$ and capacitor $C_{15}$, through gate $G_8$, and through gate $G_7$ to the emitter of the phototransistor $Q_2$ is normally low during steady state nighttime operation, and is normally high during steady state daytime operation. No matter whether input terminal 8 of gate $G_{11}$ is high or low, the output signal at output terminal 11 of gate $G_{10}$ will be high, to thereby define a first unlatched configuration for the back-to-back pair of gates $G_{10}$ and $G_{11}$.

At twelve hours after midday, as described above, the input terminal 12 of gate $G_{10}$ receives a pulse from capacitor $C_{19}$, and changes from the low to the high state. This changes the configuration of the back-to-back pair of gates $G_{10}$ and $G_{11}$. Now, the output signal at output terminal 11 of gate $G_{10}$ will be low, to thereby define a second latched configuration for the gates $G_{10}$ and $G_{11}$.

In summary, the back-to-back pair of gates $G_{10}$ and $G_{11}$ are latched in the second latched configuration from midnight to dawn of each day. At dawn, the gates $G_{10}$ and $G_{11}$ are unlatched, that is, they are set in the first unlatched configuration. The gates $G_{10}$ and $G_{11}$ are maintained in the unlatched configuration from dawn to midnight, whereupon they are latched again.

The unlatching of the gates $G_{10}$ and $G_{11}$ at dawn causes an output latch signal at output terminal 11 of gate $G_{10}$ to change from the low to the high state. This latch signal is conducted through a pulse-generating sub-circuit which is composed of pulse capacitor $C_{16}$, resistor $R_{42}$ and diode $D_{20}$. A high state latch pulse is generated, which is conducted to reset terminal 11 of the counter 60 along conductor 106, to thereby reset the counter 60 every day at dawn. The high state latch pulse is also conducted to input terminal 5 of the gate $G_{12}$ for the ultimate purpose of resetting the control unit 88 by supplying a high state control signal along conductor 112 to control terminal 10 of the control unit.

As noted previously, the input terminals 6 and 5 are normally at the low state so that the control signal at control terminal 10 of the control unit 88 is also low. However, at dawn, the high state latch pulse at input terminal 5 of gate $G_{12}$ causes the high state control signal to be generated so as to reset the control unit 88. Hence, the counter 60 and control unit 88 are reset every day at dawn, but only if the back-to-back pair of gates $G_{10}$ and $G_{11}$ have been set in the aforementioned latched configuration.

The time delay circuit composed of resistor $R_{40}$ and capacitor $C_{17}$ introduces a time delay on the order of 3 seconds so as to delay the application of power to the input terminal 12 of gate $G_{10}$. The time delay circuit composed of resistor $R_{39}$ and capacitor $C_{15}$ introduces a longer time delay so as to distinguish between cloud cover and a nighttime condition.

The diode $D_{22}$ is connected between terminal 4 of frequency divider 78 and output terminal 10 of gate $G_7$. During the night, output terminal 10 of gate $G_7$ is high. During the day, output terminal 10 of gate $G_7$ goes low, thereby effectively shorting out the capacitor $C_{13}$. This control feature is responsible for selecting whether the nighttime or the daytime signal is outputed on conductor 80, as discussed above.

In FIG. 2, the following components have the following component values: As for the capacitors $C_{10}$ and $C_{14}$ through $C_{19}$, they are 0.15, 0.01, 4.7, 0.01, 4.7, 0.01 and 0.01 microfarads, respectively. As for the capacitors $C_{11}$ through $C_{13}$, they are 220, 200 and 200 picofarads, respectively. As for the resistors $R_{30}$ through $R_{43}$, they are 1, 220, 47, 330, 330, 47, 47, 100, 300, 6200, 910, 100, 100 and 100 kilohms, respectively. All of the diodes are IN914 devices. The control transistor $Q_2$ is a 2030 device.

It will be understood that each of the elements described above or, two or more together, may also find a useful application in other types of constructions differing from the types described above. For example, a microprocessor can be programmed to perform all of the individual frequency control and counting functions in accordance with the timing cycle described above.

While the invention has been illustrated and described as embodied in a field-adjustable power control arrangement for, and method of controlling the power thereof, as well as to a method of adjusting the timing thereof, for outdoor lighting systems, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute the essential characteristics of the generic and specific aspects of this invention and, therefore, such adaptations should and are intended to be comprehended within the meaning and range of equivalents of the following claims.

What is claimed as new and desired to be protected by Letters Patent is set forth in the appended claims:

1. A power control arrangement for outdoor lighting systems, comprising:

(a) sensor means, including a photocell exposed to incident light in the circumambient region of an outdoor light, and operative for detecting the ambient light intensity surrounding the outdoor light, and means for processing the incident light into a two-state digital-type signal for generating a dawn signal and a dusk signal when dawn and dusk are respectively detected;

(b) dawn/dusk control means responsive to the generation of the dawn signal and operative to electronically process one state of the digital-type signal for generating a dawn turn-off signal for turning off the outdoor light at dawn, and also responsive to the generation of the dusk signal and operative to electronically process the other state of the digital-type signal for generating a dusk turn-on signal for turning on the outdoor light at dusk;

(c) post-dusk control means responsive to the generation of the dawn and dusk signals for generating, at a nighttime turn-off time, a nighttime turn-off signal for turning off the outdoor light after dusk and upon the elapse of a first predetermined time period after midday which is established substantially midway between the detection of dawn and dusk during the day;

(d) pre-dawn control means responsive to the generation of the dawn and dusk signals for generating, at a morning turn-on time, a morning turn-on signal for turning on the outdoor light before dawn and upon the elapse of a second predetermined time period after midday;

(e) said post-dusk control means and said pre-dawn control means sharing a common up- and down-counter means for up-counting a number of counts at a contstant daytime frequency from dawn to dusk, and at a constant nighttime turn-off frequency which is double the daytime frequency from dusk to the nighttime turn-off time, up to a first predetermined up-count at which the first predetermined time period ends, and also for down-counting a number of counts at a constant morning turn-on frequency from the nighttime turn-off time to the morning turn-on time down to a first predetermined down-count at which the second predetermined time period ends;

(f) said post-dusk control means and said pre-dawn control means also sharing a common frequency control means including time constant elements, one of the time constant elements being an interior potentiometer, and another of the time constant elements being an exterior potentiometer, and switching means for operatively connecting the time constant elements to the counter means to operate the latter from dawn to dusk at the daytime frequency, from dusk to the nighttime turn-off time at the nighttime turn-off frequency, and from the nighttime turn-off time to the morning turn-on time at the morning turn-on frequency;

(g) manual electrical adjust means, including a wiper arm on each potentiometer, for manually, electrically and adjustably setting the first and the second predetermined time periods in a continuous, infinitely variable, analog manner by varying the frequency of operation of the up- and down-counter means to thereby permit easy and rapid field adjustment and/or factory pre-adjustment of the nighttime turn-off time and the morning turn-on time for the outdoor light;

(h) automatic reset means for resetting the up- and down-counter means each day at dawn, said reset means including means responsive to the generation of the dawn and dusk signals, for generating a two-state digital-type reset signal having a reset state and a non-reset state, respectively, and means for electronically processing the reset state to generate a reset signal for resetting the up- and down-counter means; and (i) pre-set means for pre-setting the counter means at a pre-set time prior to dawn, and automatic reset means for resetting the counter means each day at dawn, but only after the counter means has first been pre-set by the pre-set means.

2. A power control arrangement for outdoor lighting systems, comprising:

(a) sensor means for detecting the ambient light intensity surrounding an outdoor light, and for generating a dawn signal and a dusk signal when dawn and dusk are respectively detected;

(b) dawn/dusk control means responsive to the generation of the dawn signal for generating a dawn turn-off signal for turning off the outdoor light at dawn, and also responsive to the generation of the dusk signal for generating a dusk turn-on signal for turning on the outdoor light at dusk;

(c) post-dusk control means responsive to the generation of the dawn and dusk signals for generating, at a nighttime turn-off time, a nighttime turn-off signal for turning off the outdoor light after dusk and upon the elapse of a first predetermined time period after midday which is established substantially midway between the detection of dawn and dusk during the day;

(d) pre-dawn control means responsive to the generation of the dawn and dusk signals for generating, at a morning turn-on time, a morning turn-on signal for turning on the outdoor light before dawn and upon the elapse of a second predetermined time period after midday;

(e) said post-dusk control means and said pre-dawn control means sharing a common counter means for up-counting a number of counts at a constant daytime frequency from dawn to dusk, and at a constant nighttime frequency which is double the daytime frequency from dusk to the nighttime turn-off time up to a first predetermined up-count at which the first predetermined time period ends, and also for up-counting a number of counts at the constant nighttime frequency from the nighttime turn-off time up to a second predetermined up-count at which the second predetermined time period ends;

(f) said post-dusk control means and said pre-dawn control means also sharing a bank of manually settable switches operatively connected to the counter means, for varying the number of counts in the first and the second up-counts in a digital manner;

(g) manual electrical adjust means for manually, electrically and adjustably setting the first and the second predetermined time periods by varying the number of counts in the first and the second up-counts to thereby permit easy and rapid field adjustment and/or factory pre-adjustment of the nighttime turn-off time and the morning turn-on time for the outdoor light; and (h) a control switch operatively connected between a power source and the outdoor light, and responsive to the dawn turn-off and the nighttime turn-off signals to disable the outdoor light from the power source, and further responsive to the dusk turn-on and the morning turn-on signals to enable the outdoor light from the power source.

* * * * *